United States Patent
Xie

(10) Patent No.: US 10,822,243 B1
(45) Date of Patent: Nov. 3, 2020

(54) MOLECULAR SIEVE SSZ-118, ITS SYNTHESIS AND USE

(71) Applicant: CHEVRON U.S.A. INC., San Ramon, CA (US)

(72) Inventor: Dan Xie, Richmond, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/856,126

(22) Filed: Apr. 23, 2020

Related U.S. Application Data

(60) Provisional application No. 62/879,609, filed on Jul. 29, 2019.

(51) Int. Cl.
  *C01B 39/48* (2006.01)
  *B01J 29/70* (2006.01)

(52) U.S. Cl.
  CPC ............ *C01B 39/48* (2013.01); *B01J 29/70* (2013.01); *C01P 2002/72* (2013.01); *C01P 2004/03* (2013.01)

(58) Field of Classification Search
  CPC .......... C01B 39/40; C01B 39/48; B01J 29/40; B01J 29/70; C01P 2002/72
  See application file for complete search history.

(56) References Cited

U.S. PATENT DOCUMENTS

| | | | | |
|---|---|---|---|---|
| 5,137,705 | A * | 8/1992 | Valyocsik | B01J 29/04 208/108 |
| 6,136,290 | A * | 10/2000 | Benazzi | B01J 29/04 208/120.01 |
| 6,500,404 | B1 | 12/2002 | Camblor Fernandez et al. | |
| 7,485,766 | B2 * | 2/2009 | Burton, Jr. | B01J 29/035 585/638 |
| 7,651,677 | B1 | 1/2010 | Strohmaier et al. | |
| 2015/0328627 | A1 * | 11/2015 | Burton | C07D 207/06 548/524 |
| 2016/0060129 | A1 | 3/2016 | Burton et al. | |

OTHER PUBLICATIONS

Burton et al, "A comparative study of three closely related unsolved zeolite structures", International Zeolite Conference, pp. 690-697 (2007) (Year: 2007).*

Wang et al, "Synthesis of nano-zeolite IM-5 by hydrothermal method with the aid of PEG and CTAB", Materials Letters, 69 (2012) 16-19 (Year: 2012).*

A. Jackowski, S.I.Zones, S-J. Hwang and A.W. Brton "Diquaternary Ammonium Compounds in Zeolite Synthesis: Cyclic and Polycyclic N-Heterocycles Connected by Methylene Chains" J. Am. Chem. Soc. 2009, 131, 1092-1100.

* cited by examiner

*Primary Examiner* — David M Brunsman

(57) ABSTRACT

A novel synthetic crystalline molecular sieve material, designated SSZ-118, is provided. SSZ-118 can be synthesized using 1,6-bis(N-methylpyrrolidinium)hexane dications as a structure directing agent. SSZ-118 may be used in organic compound conversion and/or sorptive processes.

7 Claims, 2 Drawing Sheets

MOLECULAR SIEVE SSZ-118, ITS SYNTHESIS AND USE

CROSS-REFERENCE TO RELATED APPLICATIONS

This application claims priority to and the benefit of U.S. Provisional Application Ser. No. 62/879,609, filed Jul. 29, 2019.

FIELD

This disclosure relates to a novel synthetic crystalline molecular sieve designated SSZ-118, its synthesis, and its use in organic compound conversion and sorption processes.

BACKGROUND

Molecular sieves are a commercially important class of materials that have distinct crystal structures with defined pore structures that are shown by distinct X-ray diffraction (XRD) patterns and have specific chemical compositions. The crystal structure defines cavities and pores that are characteristic of the specific type of molecular sieve.

According to the present disclosure, a new crystalline molecular sieve, designated SSZ-118 and having a unique powder X-ray diffraction pattern, has now been synthesized using 1,6-bis(N-methylpyrrolidinium)hexane dications as a structure directing agent.

SUMMARY

In one aspect, there is provided a molecular sieve having, in its as-synthesized form, a powder X-ray diffraction pattern including the following peaks:

| 2-Theta [°]   | d-Spacing [Å] | Relative Intensity |
|---------------|---------------|--------------------|
| 7.54 ± 0.30   | 11.28-12.21   | s-vs               |
| 22.91 ± 0.30  | 3.83-3.93     | s-vs               |

In its as-synthesized and anhydrous form, the molecular sieve can have a chemical composition comprising the following molar relationship:

|                                   | Broadest   | Secondary  |
|-----------------------------------|------------|------------|
| SiO$_2$/Al$_2$O$_3$               | 20 to 100  | 30 to 70   |
| Q/SiO$_2$                         | >0 to 0.1  | >0 to 0.1  |
| M/SiO$_2$                         | >0 to 0.1  | >0 to 0.1  | wherein Q comprises 1,6-bis(N-methylpyrrolidinium) hexane dications and M is a Group 1 or Group 2 metal.

In another aspect, there is provided a molecular sieve having, in its calcined form, a powder X-ray diffraction pattern including the following peaks:

| 2-Theta [°]   | d-Spacing [Å] | Relative Intensity |
|---------------|---------------|--------------------|
| 7.54 ± 0.30   | 11.28-12.21   | s-vs               |
| 22.91 ± 0.30  | 3.83-3.93     | s-vs               |

In its calcined form, the molecular sieve can have a chemical composition comprising the following molar relationship:

Al$_2$O$_3$:(n)SiO$_2$ wherein n is in a range of from 20 to 100.

In a further aspect, there is provided a method of synthesizing the molecular sieve described herein, the method comprising (a) providing a reaction mixture comprising: (1) a source of silicon oxide; (2) a source of aluminum oxide; (3) a source of a Group 1 or Group 2 metal (M); (4) a structure directing agent (Q) comprising 1,6-bis(N-methylpyrrolidinium)hexane; (5) a source of hydroxide ions; and (6) water; and (b) subjecting the reaction mixture to crystallization conditions sufficient to form crystals of the molecular sieve.

In yet a further aspect, there is provided a process of converting a feedstock comprising an organic compound to a conversion product which comprises contacting the feedstock at organic compound conversion conditions with a catalyst comprising the molecular sieve described herein.

DETAILED DESCRIPTION

Definitions

Figure 1:
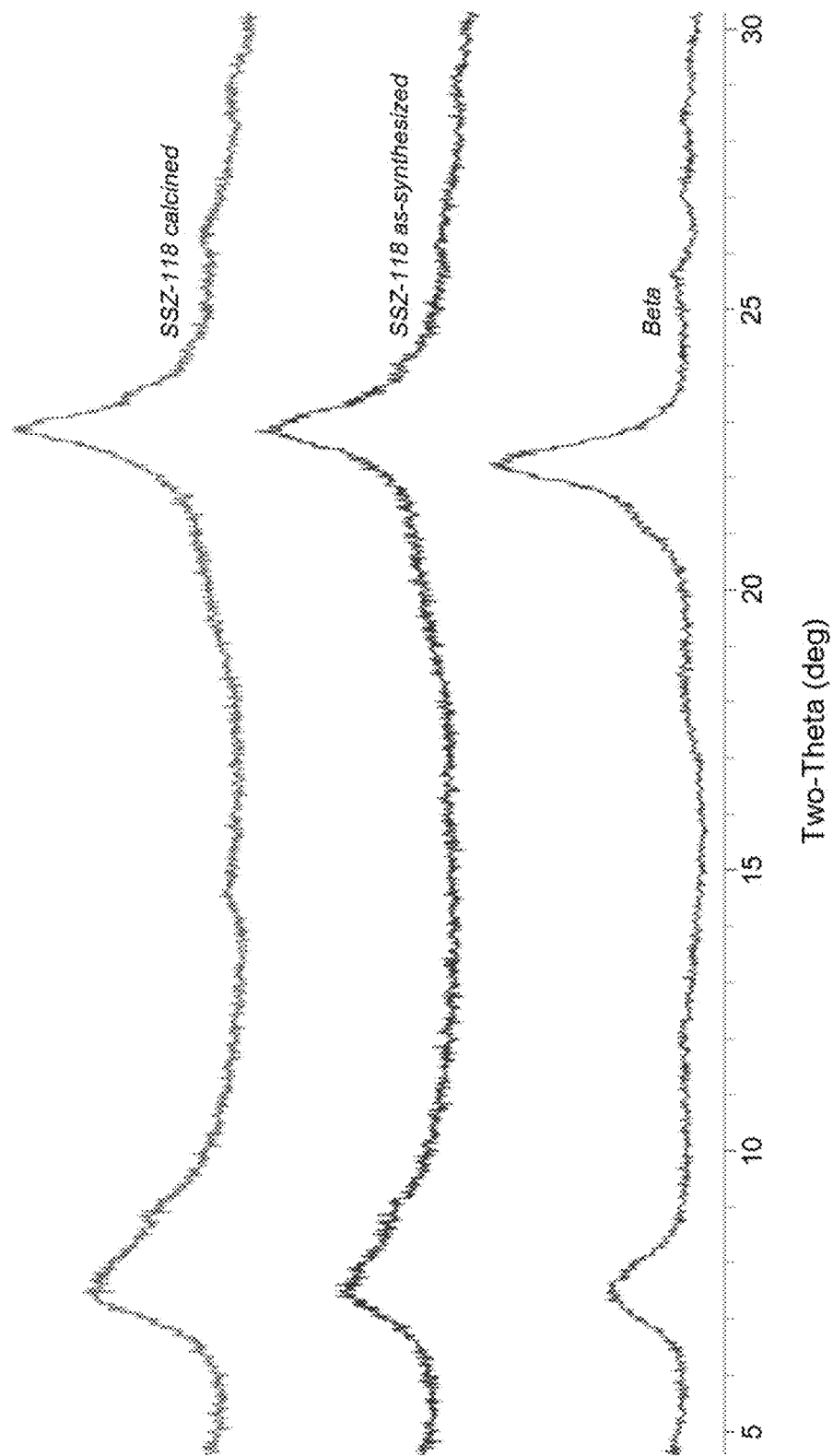
FIG. 1 compares the powder X-ray diffraction (XRD) patterns of as-synthesized SSZ-118 prepared in Example 1, calcined SSZ-118 prepared in Example 7, and zeolite Beta prepared in Example 5.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Synthesis of the Molecular Sieve

Molecular sieve SSZ-118 can be synthesized by: (a) providing a reaction mixture comprising (1) a source of silicon oxide; (2) a source of aluminum oxide; (3) a source of a Group 1 or Group 2 metal (M); (4) a structure directing agent (Q) comprising 1,6-bis(N-methylpyrrolidinium) hexane dications; (5) a source of hydroxide ions; and (6) water; and (b) subjecting the reaction mixture to crystallization conditions sufficient to form crystals of the molecular sieve.

The reaction mixture can have a composition, in terms of molar ratios, within the ranges set forth in Table 1:

TABLE 1

| Reactants                  | Broadest     | Secondary    |
|----------------------------|--------------|--------------|
| SiO$_2$/Al$_2$O$_3$        | 50 to 100    | 50 to 100    |
| M/SiO$_2$                  | 0.05 to 0.50 | 0.25 to 0.40 |
| Q/SiO$_2$                  | 0.05 to 0.30 | 0.05 to 0.15 |
| OH/SiO$_2$                 | 0.40 to 0.70 | 0.45 to 0.60 |
| H$_2$O/SiO$_2$             | 20 to 40     | 25 to 35     |

In some aspects, the reaction mixture can have a SiO$_2$/Al$_2$O$_3$ molar ratio in a range of 60 to 80.

Suitable sources of silicon oxide can include colloidal silica, fumed silica, precipitated silica, alkali metal silicates and tetraalkyl orthosilicates.

Suitable sources of aluminum oxide can include hydrated alumina, aluminum hydroxide, alkali metal aluminates, aluminum alkoxides, and water-soluble aluminum salts (e.g., aluminum nitrate).

Combined sources of silicon oxide and aluminum oxide can additionally or alternatively be used and can include aluminosilicate zeolites (e.g., zeolite Y) and clays or treated clays (e.g., metakaolin).

Any M-containing compound not detrimental to crystallization process can be used. Sources of the Group 1 or Group 2 metal can include metal hydroxide, metal oxide, metal halide, metal sulfate, metal nitrate, metal carboxylate, and metal aluminate. As used herein, the phrase "Group 1 or Group 2 metal" does not mean the Group 1 metals and Group 2 metals are used in the alternative, but instead that one or more Group 1 metals can be used alone or in combination with one or more Group 2 metals and that one or more Group 2 metals can be used alone or in combination with one or more Group 1 metals. Preferred Group 1 or Group 2 metals include sodium, potassium, and combinations thereof.

The structure directing agent (Q) comprises 1,6-bis(N-methylpyrrolidinium)hexane dications, represented by the following structure (1):

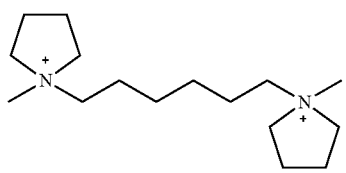

(1)

Suitable sources of Q are the hydroxides and/or other salts of the diquaternary ammonium compound.

The reaction mixture may contain seeds of a crystalline material, such as SSZ-118 from a previous synthesis, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-118 over any undesired phases.

It is noted that the reaction mixture components can be supplied by more than one source. Also, two or more reaction components can be provided by one source. The reaction mixture can be prepared either batchwise or continuously.

Crystallization and Post-Synthesis Treatment

Crystallization of the molecular sieve from the above reaction mixture can be carried out under either static, tumbled or stirred conditions in a suitable reactor vessel, such as polypropylene jars or Teflon-lined or stainless-steel autoclaves, at a temperature of from 125° C. to 200° C. (e.g., 150° C. to 180° C.) for a time sufficient for crystallization to occur at the temperature used (e.g., from 1 day to 14 days). Crystallization is usually conducted in an autoclave so that the reaction mixture is subject to autogenous pressure.

Once the molecular sieve crystals have formed, the solid product is recovered from the reaction mixture by standard mechanical separation techniques such as centrifugation or filtration. The recovered solids are then rinsed with deionized water, and dried at an elevated temperature (e.g., 75° C. to 150° C.) for several hours (e.g., about 4 to 24 hours). The drying step can be performed under vacuum or at atmospheric pressure.

As a result of the crystallization process, the recovered crystalline molecular sieve product contains within its pore structure at least a portion of the structure directing agent used in its synthesis.

The as-synthesized molecular sieve may be subjected to treatment to remove part or all of the structure directing agent used in its synthesis. Removal of the structure directing agent may be carried out by thermal treatment (e.g., calcination) in which the as-synthesized molecular sieve is heated at a temperature sufficient to remove part or all of the structure directing agent. While sub-atmospheric pressure may be used for the thermal treatment, atmospheric pressure is desired for reasons of convenience. The thermal treatment may be performed at a temperature at least 370° C. for at least a minute and generally not longer than 20 hours (e.g., from 1 to 12 hours). The thermal treatment can be performed at a temperature of up to 925° C. For example, the thermal treatment may be conducted at a temperature of 400° C. to 600° C. in the presence of an oxygen-containing gas. Additionally or alternatively, the structure directing agent may be removed by treatment with ozone.

Any extra-framework metal cations in the molecular sieve can be replaced in accordance with techniques well known in the art (e.g., by ion exchange) with other cations. Replacing cations can include metal ions, hydrogen ions, hydrogen precursor (e.g., ammonium) ions, and mixtures thereof. Particularly preferred replacing cations are those which tailor the catalytic activity for certain organic conversion reactions. These include hydrogen, rare earth metals, and metals of Groups 2 to 15 of the Periodic Table of the Elements.

Characterization of the Molecular Sieve

In its as-synthesized and anhydrous form, molecular sieve SSZ-118 can have a chemical composition comprising the following molar relationship as described in Table 2:

TABLE 2

| | Broadest | Secondary |
|---|---|---|
| $SiO_2/Al_2O_3$ | 20 to 100 | 30 to 70 |
| $Q/SiO_2$ | >0 to 0.1 | >0 to 0.1 |
| $M/SiO_2$ | >0 to 0.1 | >0 to 0.1 | wherein compositional variables Q and M are as described herein above.

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

In its calcined form, molecular sieve SSZ-118 can have a chemical composition comprising the following molar relationship:

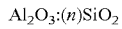

$Al_2O_3:(n)SiO_2$ wherein n is at least 20 to 100 (e.g., 30 to 70, 35 to 60, or 40 to 50).

The novel molecular sieve structure SSZ-118 is characterized by a powder XRD pattern which, in the as-synthesized form of the molecular sieve, includes at least the peaks set forth in Table 3 and which, in the calcined form of the molecular sieve, includes at least the peaks set forth in Table 4.

TABLE 3

Characteristic Peaks for As-Synthesized SSZ-118

| 2-Theta [°] | d-Spacing [Å] | Relative Intensity |
|---|---|---|
| 7.54 ± 0.30 | 11.28-12.21 | s-vs |
| 22.91 ± 0.30 | 3.83-3.93 | s-vs |

TABLE 4

Characteristic Peaks for Calcined SSZ-118

| 2-Theta [°] | d-Spacing [Å] | Relative Intensity |
|---|---|---|
| 7.54 ± 0.30 | 11.28-12.21 | s-vs |
| 22.91 ± 0.30 | 3.83-3.93 | s-vs |

The powder XRD patterns provided herein are based on a relative intensity scale in which the strongest line in the X-ray diffraction pattern is assigned a value of 100, where the corresponding relative intensities are: w (weak) is ≤20; m (medium) is >20 to ≤40; s (strong) is >40 to ≤60; and vs (very strong) is >60. When a characteristic line is present near an end point for one of these ranges, variations in the intensity of the line due to various known experimental factors, including the presence of impurities and the instrument used, can result in the intensity being in the adjacent range. Therefore, this line can be described as being a combination of two ranges. For example, a line with an intensity of 18 is at the upper end of a weak range, but a small variation could result in the intensity being in the range of about 20-25. In this case, the intensity range could be reported as being w-m.

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Sorption and Catalysis

Molecular sieve SSZ-118 may be used as a sorbent or as a catalyst to catalyze a wide variety of organic compound conversion processes including many of present commercial/industrial importance. Examples of chemical conversion processes which are effectively catalyzed by SSZ-118, by itself or in combination with one or more other catalytically active substances including other crystalline catalysts, include those requiring a catalyst with acid activity. Examples of organic conversion processes which may be catalyzed by SSZ-118 may include cracking, hydrocracking, disproportionation, alkylation, oligomerization, and isomerization.

As in the case of many catalysts, it may be desirable to incorporate SSZ-118 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with SSZ-118 (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with SSZ-118 include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-118 also include inorganic oxides, such as silica, zirconia, titania, magnesia, beryllia, alumina, and mixtures thereof.

In addition to the foregoing materials, SSZ-118 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of SSZ-118 and inorganic oxide matrix may vary widely, with the SSZ-118 content ranging from 1 to 90 wt. % (e.g., 2 to 80 wt. %) of the composite.

EXAMPLES

The following illustrative examples are intended to be non-limiting.

Example 1

1.30 g of deionized water, 0.28 g of a 45% KOH solution, 1.08 g of a 20% 1,6-bis(N-methylpyrrolidinium)hexane hydroxide solution (SACHEM, Inc.), 0.02 g of 50% Reheis F-2000 aluminum hydroxide dried gel and 1.50 g of LUDOX© AS-30 colloidal silica (30 wt. % suspension in water) were mixed together in a Teflon liner. The gel was stirred until it became homogeneous. The liner was then capped and placed within a Parr Steel autoclave reactor. The autoclave was then put in an oven heated at 160° C. for 7 days with tumbling at 43 rpm. The solid products were recovered from the cooled reactor by centrifugation, washed with deionized water and dried at 95° C.

Figure 2:
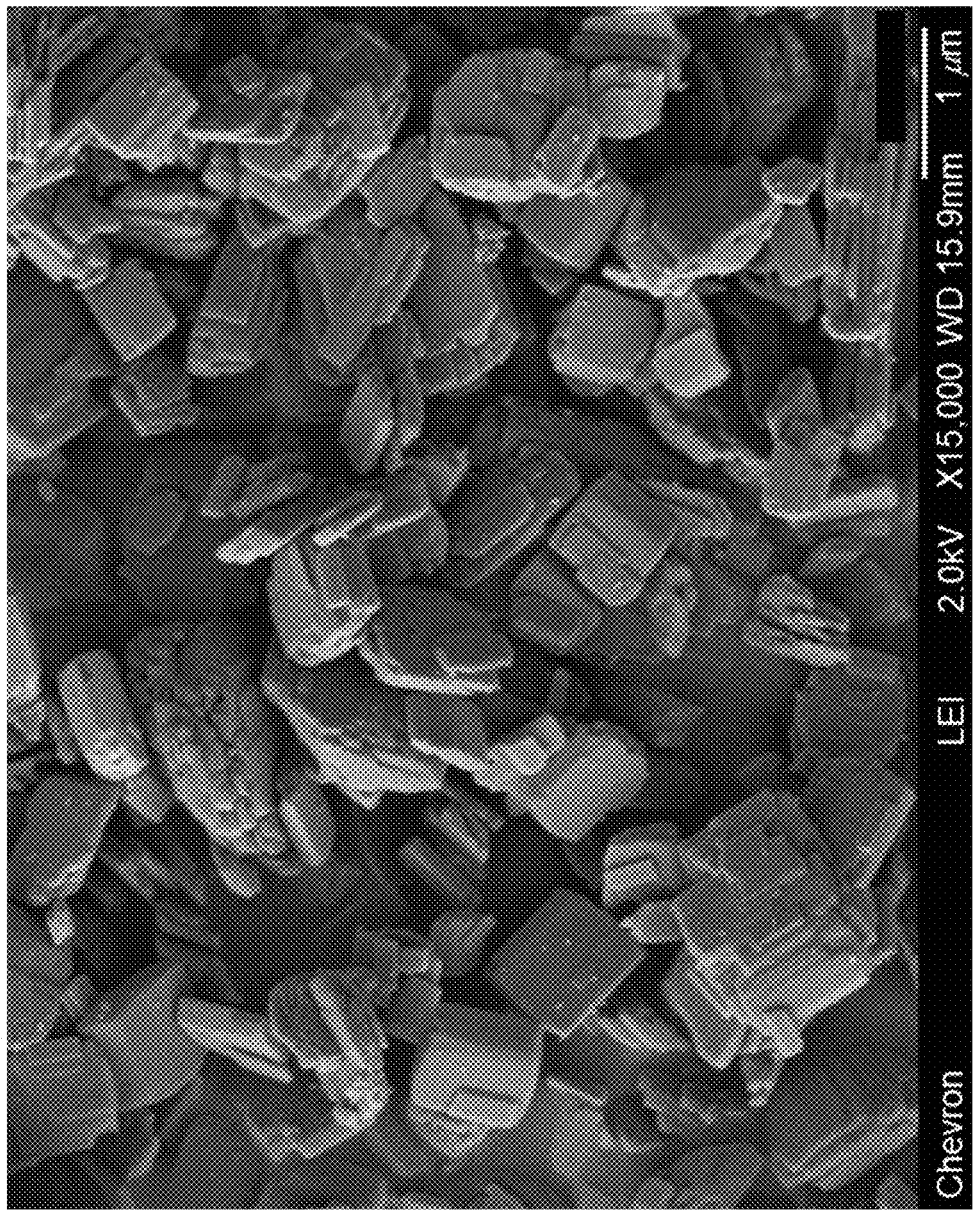
FIG. 2 is a Scanning Electron Micrograph (SEM) image of as-synthesized SSZ-118 prepared in Example 1.

The resulting product was analyzed by powder XRD and SEM. The powder XRD pattern of the product is shown in FIG. 1 and indicates that the product is a new phase, designated SSZ-118. A SEM image of the product image is shown in FIG. 2 and indicates a uniform field of crystals.

It is believed that the peak broadening seen in the XRD pattern is due to disorder in the SSZ-118 crystal structure rather than to small crystal size.

The product had a SiO$_2$/Al$_2$O$_3$ molar ratio of 45.9, according to Inductively Coupled Plasma (ICP) elemental analysis.

Example 2

1.82 g of deionized water, 0.24 g of a 50% NaOH solution, 1.44 g of a 20% 1,6-bis(N-methylpyrrolidinium) hexane hydroxide solution, 0.02 g of 50% Reheis F-2000 aluminum hydroxide dried gel and 2.00 g of LUDOX© AS-30 colloidal silica were mixed together in a Teflon liner. The resulting gel was stirred until it became homogeneous. The liner was then capped and placed within a Parr Steel autoclave reactor. The autoclave was then put in an oven heated at 160° C. for 7 days with tumbling at 43 rpm. The solid products were recovered from the cooled reactor by centrifugation, washed with deionized water and dried at 95° C.

The as-synthesized product was identified by powder XRD and SEM as a pure aluminosilicate SSZ-118 molecular sieve.

The product had a SiO$_2$/Al$_2$O$_3$ molar ratio of 49.6, according to ICP elemental analysis.

Example 3

4.08 g of deionized water, 0.13 g of a 50% NaOH solution, 1.16 g of a 20% 1,6-bis(N-methylpyrrolidinium) hexane hydroxide solution and 0.50 g of CBV760 Y-zeolite powder (Zeolyst International, SiO$_2$/Al$_2$O$_3$ molar ratio=60) were mixed together in a Teflon liner. The resulting gel was stirred until it became homogeneous. The liner was then capped and placed within a Parr Steel autoclave reactor. The autoclave was then put in an oven heated at 170° C. for 7 days under static conditions. The solid products were recovered from the cooled reactor by centrifugation, washed with deionized water and dried at 95° C.

The resulting product was identified by powder XRD and SEM as a pure aluminosilicate SSZ-118 molecular sieve.

The product had a SiO$_2$/Al$_2$O$_3$ molar ratio of 41.7, according to ICP elemental analysis.

Example 4

8.14 g of deionized water, 0.32 g of a 50% NaOH solution, 2.32 g of a 20% 1,6-bis(N-methylpyrrolidinium) hexane hydroxide solution and 1.00 g of CBV780 Y-zeolite powder (Zeolyst International, SiO$_2$/Al$_2$O$_3$ molar ratio=80) were mixed together in a Teflon liner. The resulting gel was stirred until it became homogeneous. The liner was then capped and placed within a Parr Steel autoclave reactor. The autoclave was then put in an oven heated at 170° C. for 7 days under static conditions. The solid products were recovered from the cooled reactor by centrifugation, washed with deionized water and dried at 95° C.

The resulting product was identified by powder XRD and SEM as a pure aluminosilicate SSZ-118 molecular sieve.

The product had a SiO$_2$/Al$_2$O$_3$ molar ratio of 48.5, according to ICP elemental analysis.

Example 5 (Comparative)

Example 2 was repeated except that no additional deionized water was added in the synthesis gel. The H$_2$O/SiO$_2$ molar ratio of the reaction mixture in this Example is 15, whereas the H$_2$O/SiO$_2$ molar ratio of the reaction mixture in Example 2 is 25. The autoclave was put in an oven heated at 160° C. for 7 days with tumbling at 43 rpm. The solid products were recovered from the cooled reactor by centrifugation, washed with deionized water and dried at 95° C.

The resulting product was identified by powder XRD and SEM as a pure Beta zeolite. The powder XRD pattern of the product is shown in FIG. 1.

Example 6 (Comparative)

1.82 g of deionized water, 0.24 g of a 50% NaOH solution, 1.44 g of a 20% 1,6-bis(N-methylpyrrolidinium) hexane hydroxide solution, 0.01 g of 50% Reheis F-2000 aluminum hydroxide dried gel and 2.00 g of LUDOX© AS-30 colloidal silica were mixed together in a Teflon liner. The resulting gel was stirred until it became homogeneous. The liner was then capped and placed within a Parr Steel autoclave reactor. The autoclave was then put in an oven heated at 160° C. for 7 days with tumbling at 43 rpm. The solid products were recovered from the cooled reactor by centrifugation, washed with deionized water and dried at 95° C.

The as-synthesized product was identified by powder XRD and SEM as a pure SSZ-74 zeolite. This example shows that crystallizing a reaction mixture having a SiO$_2$/Al$_2$O$_3$ molar ratio greater than 100 produces SSZ-74 rather than SSZ-118.

Example 7

The as-synthesized molecular sieve product from example 1 was calcined inside a muffle furnace under a flow of air heated to 540° C. at a rate of 1° C./minute and held at 540° C. for 5 hours, cooled and then analyzed by powder XRD. The powder XRD pattern of the calcined material is shown in FIG. 1 and indicates that the material remains stable after calcination to remove the structure directing agent.

Example 8

The calcined material from Example 7 was treated with 10 mL (per g of molecular sieve) of a 1 N ammonium nitrate solution at 95° C. for 2 hours. The solution was cooled, decanted off and the same process repeated.

The product (NH$_4$-SSZ-118) after drying was subjected to a micropore volume analysis using nitrogen as adsorbate and via the B.E.T. method. The molecular sieve exhibited a micropore volume of 0.20 cm$^3$/g.

Example 9

The product (NH$_4$-SSZ-118) after drying was subjected to a micropore size analysis using argon as adsorbate and via the DFT (density-function theory) method. The molecular sieve exhibited a micropore size of 5.6 Å, indicating that SSZ-118 likely contains a medium-pore system.

The invention claimed is:
1. A molecular sieve having, in its calcined form, a powder X-ray diffraction pattern consisting of the following peaks:

| 2-Theta [°] | d-Spacing [Å] | Relative Intensity |
|---|---|---|
| 7.59 ± 0.30 | 11.21–12.13 | s-vs |
| 22.94 ± 0.30 | 3.83–3.93 | s-vs. |

2. The molecular sieve of claim 1, and having a composition comprising the molar relationship:

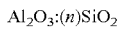

wherein n is in a range of 20 to 100.

3. The molecular sieve of claim 1, and having a composition comprising the molar relationship:

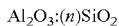

wherein n is in a range of 30 to 70.

4. A process for converting a feedstock comprising an organic compound to a conversion product, the process comprising contacting the feedstock at organic compound conversion conditions with a catalyst comprising the molecular sieve of claim 1.

5. A molecular sieve having, in its as-synthesized form, a powder X-ray diffraction pattern consisting of the following peaks:

| 2-Theta [°] | d-Spacing [Å] | Relative Intensity |
| --- | --- | --- |
| 7.54 ± 0.30 | 11.28-12.21 | s-vs |
| 22.91 ± 0.30 | 3.83-3.93 | s-vs. |

6. The molecular sieve of claim 5, having a chemical composition comprising the following molar relationship:

| | |
| --- | --- |
| $SiO_2/Al_2O_3$ | 20 to 100 |
| $Q/SiO_2$ | >0 to 0.1 |
| $M/SiO_2$ | >0 to 0.1 | wherein Q comprises 1,6-bis(N-methylpyrrolidinium) hexane dications and M is a Group 1 or Group 2 metal.

7. The molecular sieve of claim 5, having a chemical composition comprising the following molar relationship:

| | |
| --- | --- |
| $SiO_2/Al_2O_3$ | 30 to 70 |
| $Q/SiO_2$ | >0 to 0.1 |
| $M/SiO_2$ | >0 to 0.1 | wherein Q comprises 1,6-bis(N-methylpyrrolidinium) hexane dications and M is a Group 1 or Group 2 metal.

* * * * *